(12) United States Patent
Patel et al.

(10) Patent No.: US 6,807,259 B1
(45) Date of Patent: Oct. 19, 2004

(54) AUDIBLE CALLING LINE IDENTIFICATION

(75) Inventors: Pinakin A. Patel, Cary, NC (US); Naeem A. Sayed, Apex, NC (US)

(73) Assignee: Nortel Networks, Ltd., St Laurent (CA)

( * ) Notice: Subject to any disclaimer, the term of this patent is extended or adjusted under 35 U.S.C. 154(b) by 0 days.

(21) Appl. No.: 09/591,260

(22) Filed: Jun. 9, 2000

(51) Int. Cl.[7] .......................... H04M 15/06; H04M 1/56
(52) U.S. Cl. .............................. 379/142.01; 379/88.19; 379/88.2; 379/88.21
(58) Field of Search .......................... 379/88.19–88.21, 379/93.23, 142.01, 142.04, 142.06, 142.17, 245, 247, 221.08–221.12

(56) References Cited

U.S. PATENT DOCUMENTS

| | | | |
|---|---|---|---|
| 4,496,797 A | * | 1/1985 | Price |
| 4,720,848 A | | 1/1988 | Akiyama |
| 4,899,358 A | | 2/1990 | Blakley |
| 5,007,076 A | | 4/1991 | Blakley |
| 5,263,084 A | | 11/1993 | Chaput et al. .............. 379/215 |
| 5,635,980 A | * | 6/1997 | Lin et al. |
| 5,905,774 A | * | 5/1999 | Tatchell et al. |
| 6,038,443 A | * | 3/2000 | Luneau |
| 6,118,861 A | * | 9/2000 | Gutzmann et al. |
| 6,173,041 B1 | * | 1/2001 | Borland et al. |
| 6,337,898 B1 | * | 1/2002 | Gordon |
| 6,574,319 B2 | * | 6/2003 | Latter et al. ........... 379/142.07 |
| 6,633,634 B1 | * | 10/2003 | Crockett et al. ........ 379/215.01 |

\* cited by examiner

*Primary Examiner*—Duc Nguyen
(74) *Attorney, Agent, or Firm*—John C. Gorecki

(57) ABSTRACT

Audible calling line identification. Network resources are used to provide text-to-speech translation based audio "caller-ID" services to a telephone subscriber. In a plain old telephone system (POTS), audio calling line identification is played to the subscriber after the subscriber answers the phone in response to a ringing signal. The subscriber is then given the opportunity to supply a response, directing the disposition of the call. In a telephone system which supports on-hook signaling between the switch and the customer premises equipment (CPE), a setup message is sent to the CPE to go off-hook and play the audible calling line identification through a built-in speaker. An intelligent peripheral (IP) or service node within the network provides the required text-to-speech translation services.

25 Claims, 4 Drawing Sheets

AUDIBLE CALLING LINE IDENTIFICATION

BACKGROUND

1. Field of the Invention

This invention is related to the provision of calling line identification services to subscribers within a telecommunication network. More specifically, the invention relates to providing such services in an enhanced way using text-to-speech based audio.

2. Description of the Problem

The public switched telephone network (PSTN) increasingly uses a data network called the advanced intelligent network (AIN) that operates in parallel with the voice network-to provide many new, intelligent services such as voicemail, automated callback, and other custom calling features. The standard AIN uses a messaging protocol called signaling system 7 (SS7) to exchange call information between switches. SS7 is based on a set of international standards for high-speed digital communications and serves as the foundation for telephony infrastructures worldwide. In SS7, call control messages are handled by a part of the protocol called Integrated Services Digital Network (ISDN) User Part (ISUP), and queries and responses for databases are handled by a part of the protocol called the Transaction Capability Application Part (TCAP). The SS7 standards are well-known. For further information see Telcordia Technologies, GR-82-CORE, Signaling Transfer Point (STP), December, 1999, and GR-246-CORE, Specification of Signaling System Number 7, December, 1999, both of which are incorporated herein be reference.

One of the most desirable and widely used features provided using AIN services is that of calling line identification, or "caller-ID." With caller-ID, the number, and possibly the name, of a calling party is retrieved from a database in the SS7 network, coded as digital pulse trains, transmitted to the terminating switch or switching system, and sent to the called subscriber's telephone set for display on a screen in conjunction with an alerting signal such as a ring. By "in conjunction with" we mean just before, during or just after, or, as on most analog phone lines, in between rings. Preferred methods and protocols used for realizing the caller-ID feature on "plain old telephone system" (POTS) phones are discussed in the Telcordia (formerly Bellcore) standards, TR-TSY-000030, "SPCS Customer Premises Equipment Data Interface," November, 1988, and TR-TSY-000031, "CLASS Feature: Calling Number Delivery," June, 1988, which are incorporated herein by reference. With other types of telephone systems, caller-ID information is transmitted as part of the digital signaling between the switch and the phone. These include integrated services digital network (ISDN) and other digital phones, as well as analog display services interface (ADSI) analog phones. Requirements for ADSI data transmission in both the on-hook and off-hook states are specified in Telcordia standard GR-30-CORE, "Voiceband Data Transmission Interface Generic Requirements," December 1994, which is incorporated herein by reference. A problem with caller-ID as defined by these standards is that the subscriber must be able to view the display screen built into or attached to his or her telephone set in order to make use of the information.

Another calling feature made possible by the modern AIN is call waiting. Call waiting and caller-ID service have been combined in a feature called "Spontaneous Caller Identification with Call-Waiting." U.S. Pat. No. 5,263,084 describes this feature, provides background information on both call-waiting and caller-ID, and is incorporated herein by reference. Initially with Spontaneous Caller Identification with Call Waiting, the caller information was provided on a display screen in way a similar to how the information was provided with traditional caller-ID. Recently, however, the service has been offered with audio caller identification. To provide audio caller identification with call waiting, the calling line identification data retrieved over the AIN is sent to a text-to-speech translation system to be translated into audio. The translation system typically resides in an intelligent peripheral (IP) or service node on the AIN. When the feature is active, the called party can hear the number or other information about the calling party in audio format. This audio caller identification requires that the called party be on the phone engaged in a call; it cannot be provided when the subscriber telephone is in an "on-hook" condition, or before any call is connected.

Currently, the only known way to provide audio caller-ID information to a subscriber when the subscriber customer premises equipment (CPE) is in an on-hook condition is to place text-to-speech translation apparatus at the subscriber CPE. U.S. Pat. No. 6,038,443 describes such a system and is incorporated herein by reference. In this system, an electronic device is connected to the phone line and resides with the CPE. The system intercepts the standard digital pulse train containing the caller-ID information, and provides a rudimentary conversion to digitized speech, so that caller-ID information is spoken while the telephone is ringing. The text-to-speech conversion is provided through simple digit and location information look-up. Optionally, a spoken name can be read if the user has stored this in memory within the device. This system has the disadvantage of requiring the subscriber to purchase extra equipment. Additionally, the crude text-to-speech capability of this device prevents it from ever identifying callers by name unless the user has pre-recorded the name of the caller.

There is a need for a way to provide audible caller-ID using network resources in such a way that the information can be provided to the subscriber when the phone is in an on-hook condition, that is, when the phone is ringing or otherwise processing an incoming call alert. By using network resources to provide the service, the necessity for the subscriber to purchase specialized equipment is eliminated. Ideally, the text-to-speech translation capability that is used should be sophisticated enough to identify callers by name, at least in some circumstances.

SUMMARY

The present invention meets the above needs by providing an audible calling line identification system which uses network resources to provide text-to-speech translation services, and audible calling line identification services. With the present invention, these audible calling line identification services are provided to a telephone which is initially in an on-hook state. A subscriber to the service of the invention need not purchase additional equipment; the hardware needed to provide the service is owned and operated by the service provider. In the case of a POTS telephone line, the caller identification information is provided as soon as a subscriber responds to an alerting signal, such as a ring. In the case of other types of phone systems that provide for signaling to be received while an alerting signal is being processed, the audible calling line identification is provided without any subscriber action.

In one embodiment of the invention, a normal alerting signal is sent to the subscriber customer premises equipment (CPE) in response to a call being placed from a caller to the subscriber, using the public switch telephone network (PSTN). At this point, the subscriber CPE is in an on-hook condition. When the subscriber answers the phone, the resulting off-hook condition is detected. Calling line identification (caller ID) data is obtained over the advanced intelligent network (AIN) in the normal fashion. However, instead of sending this data directly to the subscriber CPE, it is first sent to a text-to-speech translation system residing within the network. Once the calling line identification data has been translated into speech, the switching system which serves the subscriber connects the subscriber CPE to the text-to-speech translation system for a period of time long enough for the audio calling line identification to be played to the subscriber. The subscriber is then given the opportunity to supply a subscriber response to the audio calling line identification, usually by hitting a key on a telephone touch tone pad. The call is then processed in accordance with the subscriber response.

The call processing described above can include many optional steps. The call processing can include, for example, connecting the subscriber and the caller if the subscriber response indicates acceptance of the call. The call processing can also include notifying the caller if the subscriber response indicates non-acceptance of the call. Additionally, in the preferred embodiment, if there is no subscriber response within a specific time period, a default call disposition is executed so that the caller is not left waiting.

If the invention is implemented in a telephone system which provides for on-hook signaling between the switch and the subscriber CPE, it is not necessary for the subscriber to answer the phone to receive the audible calling line identification of the invention. In this case the switch serving the subscriber CPE directs the subscriber CPE to activate a speaker when a call is placed to the subscriber CPE. The switch obtains calling line identification data as before, and sends the calling line identification data to the text-to-speech translation system. When the text-to-speech translation is complete, the switch connects the text-to-speech translation system to the subscriber CPE so that the audio calling line identification is played at the subscriber CPE over a speaker. In order to implement this embodiment of the invention, the subscriber's CPE must be able to understand the messaging which is received from the switching system that directs the subscriber CPE to activate a built-in speaker. One way to implement this embodiment is by making use of an analog display services interface (ADSI) telephone system and including the appropriate information in a set-up message which is sent from the switching system to the subscriber CPE. Whether the subscriber CPE actually goes off-hook and connects to the telephone network to receive standard audio in order to play the audible calling line identification, or stays on-hook and receives the audio as part of the on-hook messaging depends on the type of phone system in which the invention is being implemented.

In the specific embodiments discussed, a switching system, or telephone switch, is used to manage the connections and connect the subscriber CPE to the text-to-speech translation system. Such a switching system is operated by computer program code that is stored on a media or delivered to the switching system over a network. A switch which implements the invention includes a switching matrix, one or more peripheral modules connected to the switching matrix, one or more input/output devices connected to the switching matrix, and a computing module which controls the operation of the switch in accordance with a computer program.

If the invention is implemented using a "smart" subscriber device such as a telephone with signaling capability, appropriate computer program code is also stored within the subscriber device. This computer code allows the device to recognize the commands necessary to implement the invention. Preferably, this computer code will operate the device in accordance with agreed standards, except for the improvement necessary to implement the present invention. In the case of digital phones, such as ISDN or Internet protocol phones, the alerting signal at the phone is triggered by an alerting message. The subscriber device typically includes a control block which has a microcontroller or microprocessor and supporting circuitry and the memory required to store the computer program code. Such a device also includes a network interface, and an input/output block which provides a keypad interface and possibly a display screen. A speaker and handset is normally included. In the case of an analog phone, the speaker and handset are connected to the rest of the hardware through an amplifier and/or a switching arrangement. In the case of a digital telephone, the speaker and handset are connected to an encoder/decoder, also known as a CODEC. The hardware and computer program code within the switching system, and the hardware and computer program code within the subscriber CPE, if any, are the means for implementing the present invention.

BRIEF DESCRIPTION OF THE DRAWINGS

FIG. 2 illustrates the example of an ADSI telephone system.

DETAILED DESCRIPTION

Figure 1:
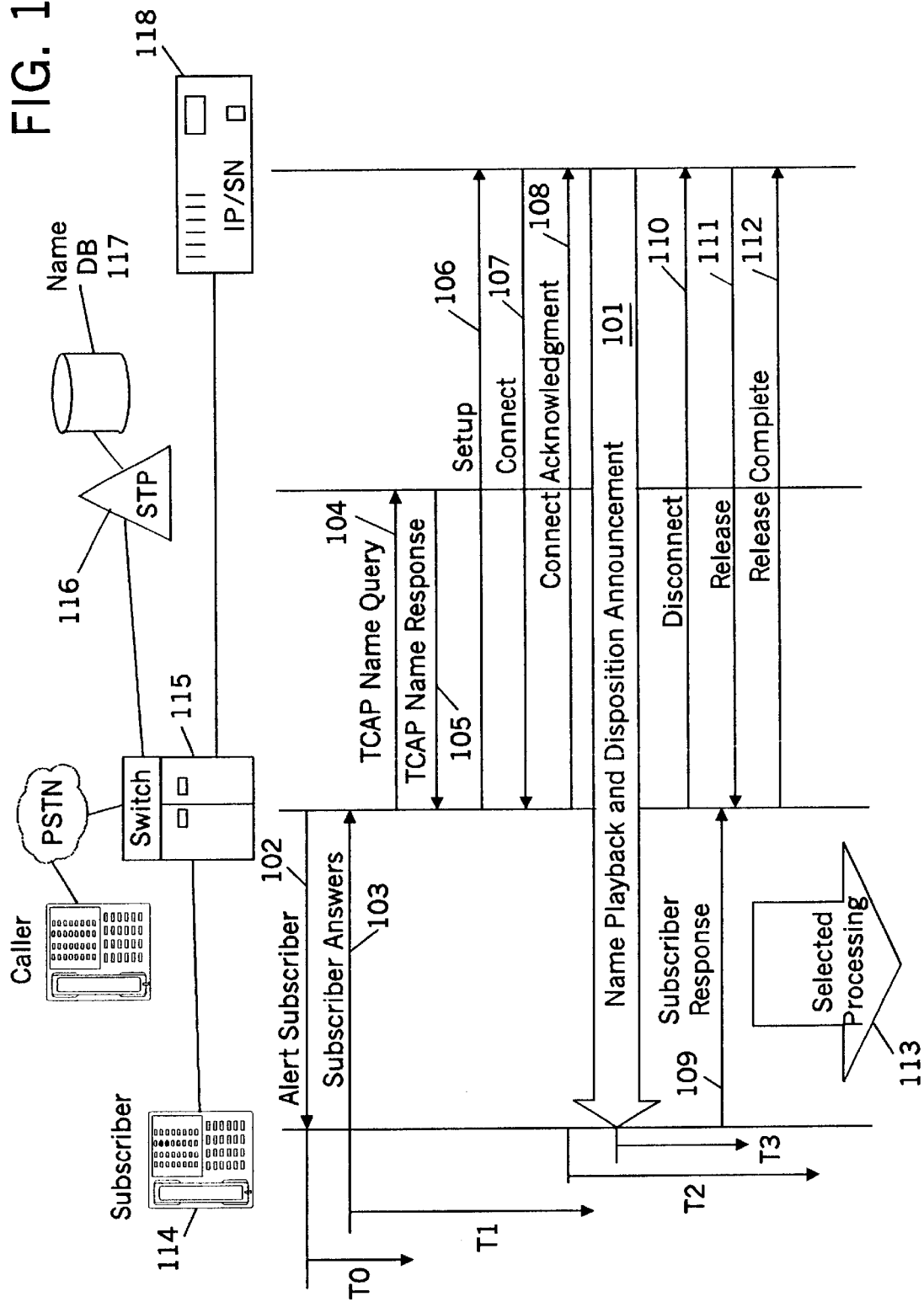
FIG. 1 is a signal flow diagram illustrating the method of the present invention where the service of the present invention is provided on a POTS telephone line.

FIG. 1 illustrates the signal flows needed to implement the method of the invention in an embodiment designed for traditional analog telephone lines, otherwise known as plain old telephone system (POTS) lines. The signaling of FIG. 1 takes place between the subscriber, 114, who has subscribed to the audible calling line identification service of the invention, switch 115, signal transfer point (STP) 116, and text-to-speech translation system 118. The text-to-speech translation system is located, in the preferred embodiment, in an intelligent peripheral (IP) or service node (SN). The operation and construction of all of these devices will be discussed in further detail below.

Initially, subscriber customer premises equipment (CPE) 114 is in an on-hook condition. At 102 an alerting signal is sent to the subscriber CPE. This is normally a ring signal, that is, a voltage that causes the telephone to ring. At 103 the subscriber answers the phone. Switch 115 detects the off-hook condition of the subscriber CPE, 114. At step 104 a name query is sent from the switch, 115, to STP 116. A response to the query is received at step 105. The query and response to the name database, 117, are handled via the TCAP of the SS7 protocol. At this point, switch 115 has the calling line identification data for the caller on this particular call. The switch sends a set-up command at step 106 to the intelligent peripheral containing the text-to-speech translation system, and receives a connect message back at 107. At step 108 the switch sends a connect acknowledgment to the intelligent peripheral or service node containing the text-to-speech translation system.

During the exchange of messages between the switch, 115, and the text-to-speech translation system which resides at 118, the calling line identification information is sent from the switch to the text-to-speech translation system. In one embodiment, the information is included in a facility information element within the set-up message 106. The connect message 107 serves to notify the switch that the text-to-speech translation is complete. This arrangement allows the calling line identification data to be transferred to the text-to-speech translation system efficiently, without modifying the standard protocols and messages normally used to interact with an intelligent peripheral or service node. Alternatively, however, special messaging could be designed to specifically handle text-to-speech translation. It should also be noted that many of the steps can be performed in a different order than what is illustrated in FIG. 1. For example, name query 104 can be executed just before or just after alerting the subscriber at step 102. And in fact, name response 105 can be received by the switch prior to the subscriber answering at step 103.

Returning to the set-up and connect messaging shown at steps 106 through 108, connect request 107, as stated above, notifies switch 115 that the text-to-speech translation is complete and the connect acknowledgment, 108, notifies the intelligent peripheral or service node, 118, that the switch 115, has connected the text-to-speech translation system all the way through to the subscriber, 114. Once the intelligent peripheral or service node has been notified that it is connected to the subscriber, it plays the audible caller identification to the subscriber at 101. The audible information is sent from the intelligent peripheral or service node to the switch as pulse-coded modulation (PCM) audio. Switch 115 then converts this to analog audio in the same way as it would any audio information being received from the network. Once the playing of the audible calling line identification is complete, a disconnect message is sent to the intelligent peripheral or service node at 110. The call is released by the service node or intelligent peripheral at 111 and a release complete message is sent back by the switch at 112.

At the end of the audio announcement, 101, described above, a prompt is inserted for the subscriber to indicate a desired disposition for the call. In this embodiment, switch 115 uses this as a prompt to issue disconnect request 110. At 109, a subscriber response is received by switch 115. When we say "a subscriber response is received" we mean an actual response, for example the touch of a key on a telephone keypad or a virtual response, for example, hanging up, or silence. It is also possible to use speech recognition capabilities at the switch to process an audio response. Once switch 115 determines the subscriber response, the call processing is continued at step 113 in accordance with that subscriber response.

The selected call processing as described above can be designed in an almost infinite variety of ways. For example, a response by the subscriber consisting of the hitting of a key on the telephone keypad can indicate acceptance of the call, non-acceptance of the call, forwarding the call to a voice-mail system, or even forwarding the call to another number. If the response indicates non-acceptance of the call, a notification can be sent back to the caller through the PSTN. This might consist of a recorded audio message stating "The party you have called does not wish to receive your call at this time." Alternatively the lack of a response for a specific time interval could indicate acceptance of the call at which point the caller and the subscriber would simply be connected. Another possibility is that the subscriber could simply hang up. At this point, the call can be made to ring through, so that an answering machine can go off-hook and record a message. Alternatively, hanging up could be interpreted as non-acceptance of the call.

It should be noted that there are several "time-out" time intervals noted on FIG. 1. T0, T1, T2, and T3 are all specific time-out intervals, the expiration of any one of which indicates a situation requiring some response by switch 115. T0 is a time-out interval for the subscriber to answer the phone. At some point, the audio calling line identification feature needs to be disabled if the subscriber does not answer. For example, this time interval could be set to be equal to a specific number of seconds or a specific number of rings. One possibility is to set the time-out for three rings. Since most answering machines can be set to answer on four rings, this would mean that if there was no answer, an answering machine could pick up and record a message immediately without having to deal with the audible caller ID feature. In any case, if the subscriber delayed long enough in answering the phone, the time to execute the audible calling line identification would be so long that the caller might hang up if a time-out function was not included. Time-out T1 is an interval during which the text-to-speech translation system is expected to respond and have the calling line identification data translated into speech. This time-out timer is optional, but is preferably used as a fail-safe in the event of a malfunction. If the text-to-speech translation system cannot perform the translation, the audible calling line identification feature is disabled by this timer. The T2 time-out timer likewise prevents the call being "hung up," so to speak, by a malfunction at the service node or intelligent peripheral. Timer T2 waits for the actual audio announcement to complete being played. Finally, time-out timer T3 is again necessary due to the human factor. If a subscriber response, as shown at 109, is not received within a specific time interval, switch 115 treats the response as a "lack of response." Time-out timer T3 enables this function.

Figure 2:
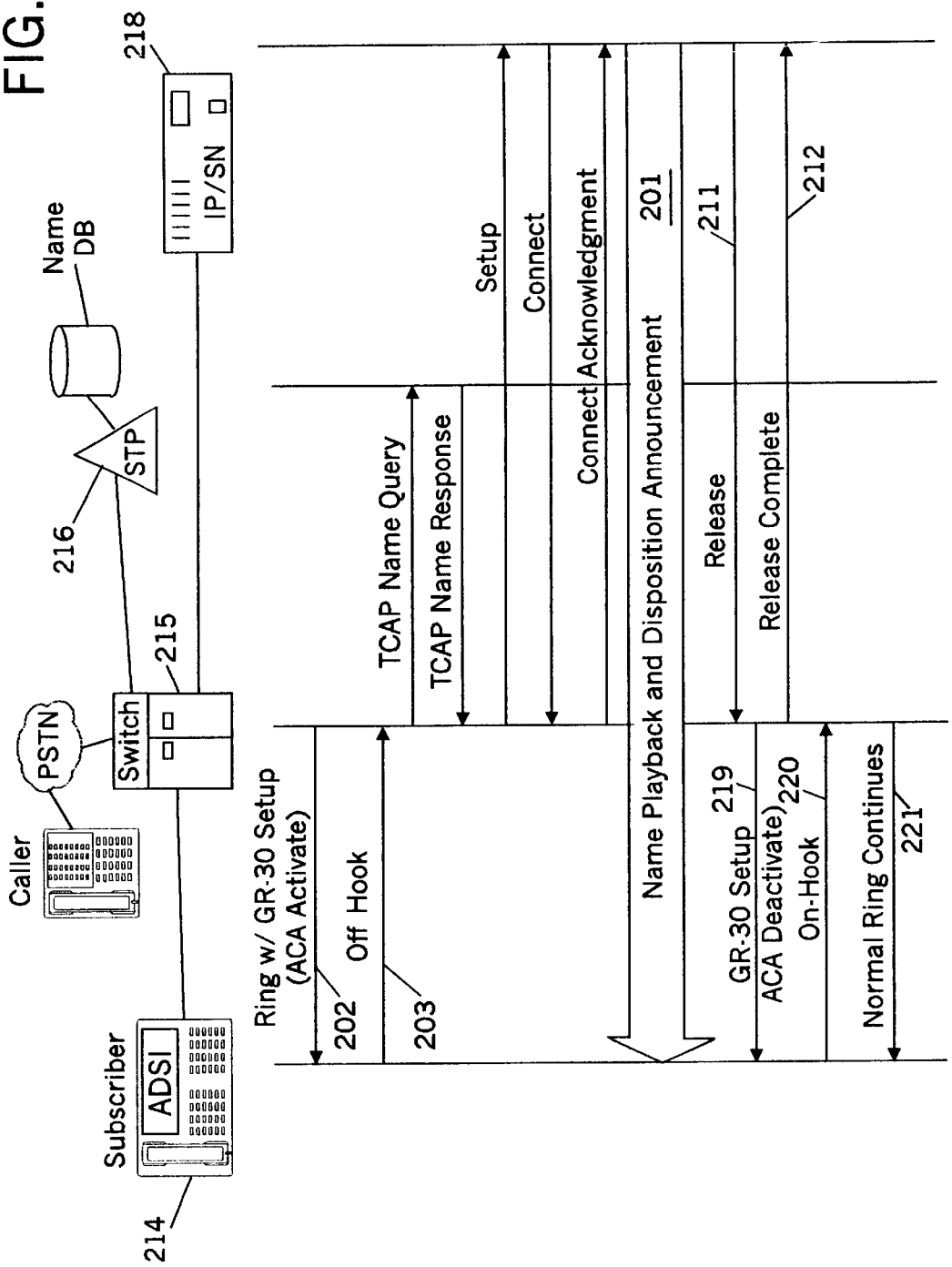
FIG. 2 is a signal flow diagram which illustrates the method of the invention where the subscriber device is a telephone which includes signaling capability.

FIG. 2 illustrates another embodiment of the invention. In FIG. 2 the subscriber CPE, 214, is a telephone which supports digital signaling in addition to standard voice telephone calls. In this particular example, the telephone is an analog display services interface (ADSI) device. It should be noted that this implementation also applies to ISDN, Internet protocol, or other digital phones which provide for digital signaling while the phone is on-hook. The example of FIG. 2 is illustrative only. At 202 a ring signal or alerting message is sent from switch 215 to subscriber 214 as before. The subscriber device processes this message to produce an alert to a subscriber, such as a ring. However, in this case, an on-hook digital signal is also sent to subscriber device 214. For an ADSI phone, this digital signal is a setup message formatted according to the previously mentioned Telcordia GR-30 standard. More details of this signaling will be discussed below. The set-up message includes an instruction or instructions to activate an audio call announcement (ACA) feature, which accommodates the audible calling line identification of the invention. The purpose of this set-up message is to direct the subscriber CPE 214 to go off-hook and activate a built-in speaker. The setup message may be combined with, or serve as, the alerting message or ring signal, or they may be sent as separate messages. At step 203 an off-hook message is sent from the subscriber CPE 214 to switch 215 to indicate that the subscriber device is ready to receive the audible calling line identification according to the invention. At this point in the process, the name query and response, and set-up and connection with the text-to-speech translation system proceeds in a fashion identical to that shown in FIG. 1. The name playback announcement is played from the text-to-speech translation system residing in intelligent peripheral or service node 218 to the subscriber CPE at 201 as before. In this case however, there is no request for a subscriber response, since the subscriber has not answered the phone. Therefore, intelligent peripheral or service node 218 issues a release command at 211 when the name playback is completed. Switch 215 sends a release complete message at 212. Switch 215 also sends another set-up message at 219, which directs the subscriber CPE 214 to deactivate the ACA feature. In this case, this setup message causes the phone to go back on-hook and send a message to that effect at 220. Normal ringing continues at 221.

It should be noted that when signaling and control of the subscriber's CPE is enabled as shown in FIG. 2, the audible calling line identification system of the invention operates without subscriber intervention. In fact, the audio announcement is simply played on the telephone speaker automatically in between rings. As before, audio from the text-to-speech translation system is sent to the switch, 215, in PCM format and converted to analog audio by the switch in the normal fashion. If the subscriber CPE, 214, is an ISDN or other digital phone, PCM audio is carried all the way through to the subscriber CPE, 214. Alternatively, the digitized audio can be encapsulated directly into a setup message and played at the subscriber CPE without the CPE actually going "off-hook."

It should be noted that regardless of the implementation of the invention, whether with a traditional POTS telephone, analog messaging phone, or any type of digital phone, the caller in every scenario simply hears ring-back generated by switch 215 or the caller's local switch. The use of the invention by the subscriber who is being called is completely transparent to the caller. It should also be noted that the connections between the various network elements shown in FIG. 1 and FIG. 2 are for example only. The switch that implements the invention may be separated from both the caller and the called subscriber by multiple switches or in fact, both may be on the same switch. Likewise the other elements of the network may be connected directly to the switch which implements the invention or separated by additional network elements.

The embodiment shown in FIG. 2 relies on ADSI GR-30 set-up messages to control the subscriber's CPE. Set-up messages according the GR-30 protocol are multiple-byte, digital messages with each byte or group of bytes indicating a specific action or containing specific information. Currently, the first byte of the set-up message specifies the message type. In the case of the invention, the first byte of the GR-30 message would indicate that the message is a set-up message. A set-up message is indicated by a one and seven zero's. The second byte of the message indicates the total message length in binary. The GR-30 set-up message then contains multiple groups of bytes where each group of bytes includes a parameter code in the first byte, a parameter length in the second byte, a qualifier in the third byte, and data in the additional bytes. The standard currently specifies qualifiers of "L" for long-distance and "R" for ringer-test. In order to implement the invention in an ADSI system, new qualifiers are added to the GR-30 set-up message. One qualifier indicates the activation of the audible call announcement feature and another parameter indicates the deactivation of the audible call announcement feature. An ADSI phone which implements the invention has been programmed to go off-hook and activate the speaker when it receives a set-up message with the activate qualifier and to go on-hook and deactivate the speaker when it receives a set-up message with the deactivate qualifier. Other groups of bytes within the set-up message can perform other functions, as the GR-30 format is a multiple-data message format (MDMF) which can include multiple parameters in a single message.

Figure 3:
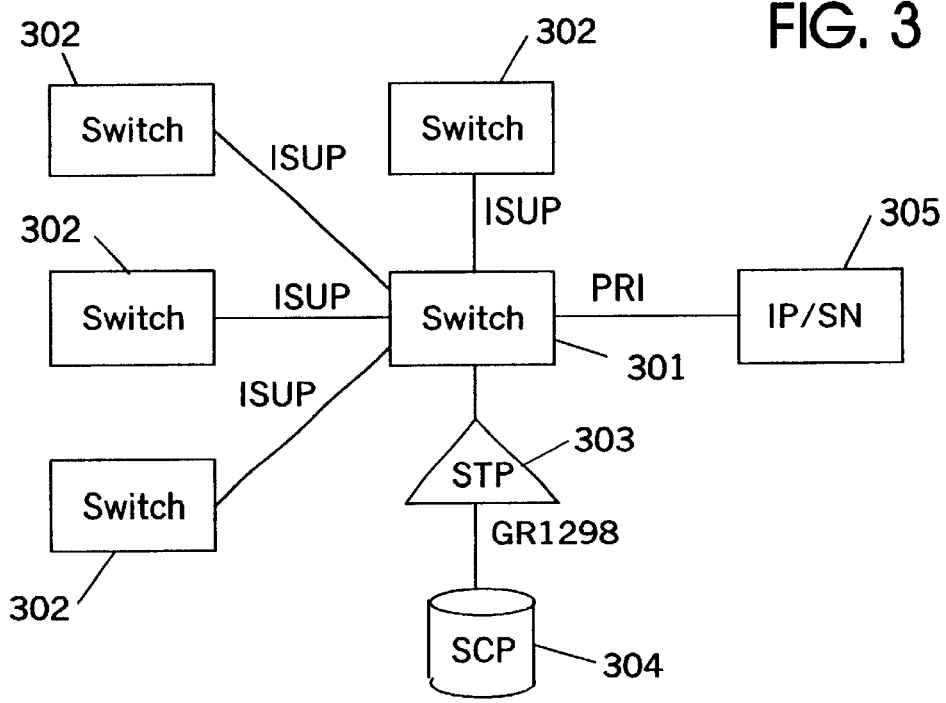
FIG. 3 illustrates a network in which the present invention is implemented.
Figure 4:
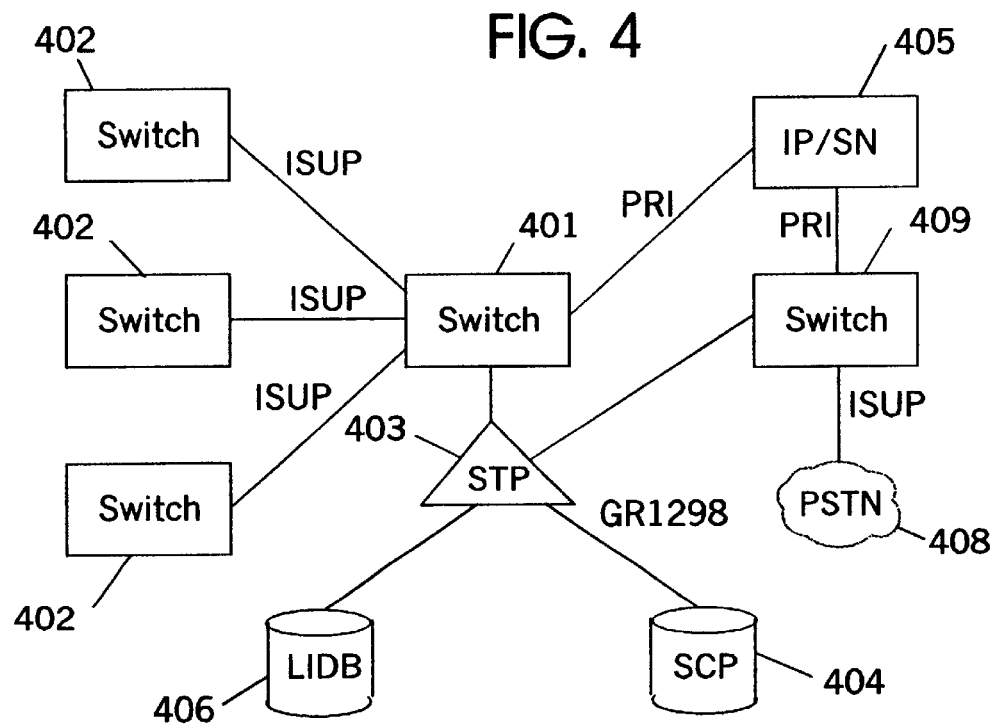
FIG. 4 illustrates another network configuration which can be used to implement the present invention.

FIGS. 3 and 4 illustrate example networks in which the present invention can be implemented. The networks shown in these figures are examples only, there is an infinite number of network configurations possible and the invention works the same regardless of the network connections. FIG. 3 illustrates a network in which switch 301 directs the calling line identification information look-up, and forwards the information to the text-to-speech translation system for translation. Any or all of switches 302 communicate with a CPE for a subscriber to the service of the present invention. Any one or all of switches 302 include the appropriate software to implement the messaging required by the invention. The text-to-speech translation system required to implement the invention resides in network node 305, which is an intelligent peripheral (IP), a specific type of service node. The switches are interconnected by ISDN user part (ISUP) trunks. The node containing the text-to-speech translation system, 305, is connected to switch 301 with an ISDN primary rate interface (PRI). TCAP name queries, formatted according to AIN standards, are sent to the signal transfer point (STP), 303, for processing. In the network of FIG. 3 the name database required to respond to the query resides in service control point (SCP) 304. STP 303 and SCP 304 are implemented according to standard SS7 protocols. Database queries are handled according to the well-known Telcordia standard GR-1298-CORE, "Advanced Intelligent Network (AIN) 0.2 Switching Systems Generic Requirements," November 1993.

FIG. 4 illustrates another example network in which the invention may be implemented. As before switches 402 can implement special signaling required between the network and the subscriber CPE. In this case, either switch 401 or switch 409 can direct name look-up operations and manage the retrieval of the audible calling line identification from the text-to-speech translation system located in node 405. Switch 409 performs these tasks for subscribers located on distant parts of PSTN 408. TCAP name queries are handled by STP 403. An important difference between this network and the network of FIG. 3 is that the name database required to implement the invention does not reside at SCP 407, but rather resides at line information database (LIDB) 406. An LIDB provides additional database capacity for the AIN. Line information databases are used to support various intelligent network services within the AIN. Line information databases can contain very detailed information. An LIDB is connected to an STP via a high-speed, packet-switched network. Therefore information stored in the LIDB is sent back almost instantaneously to a network switch that is processing a call.

Figure 5:
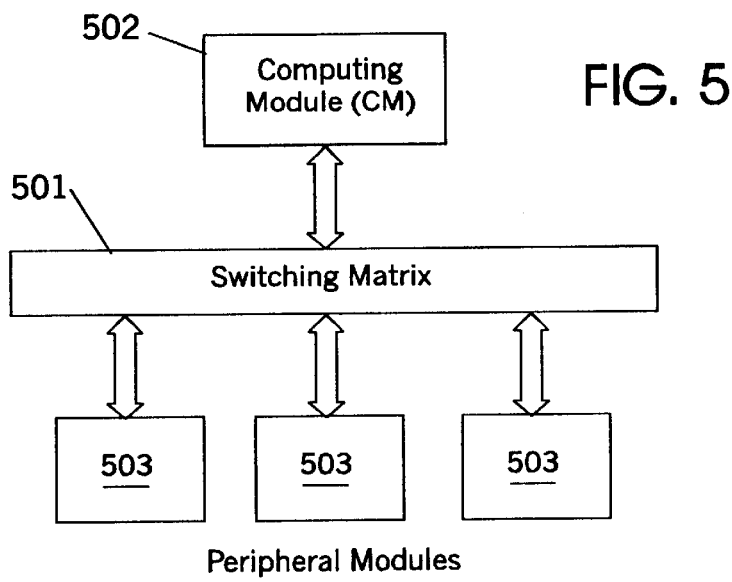
FIG. 5 is a functional block diagram of a switching system which can be used to implement the present invention.

FIG. 5 illustrates a functional block diagram of a switch that is used to implement the present invention. Computing module (CM) 502 includes a central processing unit, memory, and supporting circuitry. This computing module, together with any computer program code stored in memory is the means for controlling the overall operation of the switch. The computer program code stored in memory includes the computer program code required to implement the present invention. Switching matrix 501 allows the computing module to communicate with the other components. The switching matrix 501 includes one or more busses and accompanying internal circuitry. Peripheral modules 503 are connected to the switching matrix 501 and are managed by the computing module 502. The peripheral modules, 503, provide interfaces to various networks including various types of line interfaces, as well as interfaces to CPE. Additionally, a peripheral module can provide connection to input/output (I/O) devices including removable media devices to load computer program code, workstations, and similar equipment. This hardware in combination with appropriate computer program code provides the means to implement the elements of the invention, which reside in the switch.

Figure 6:
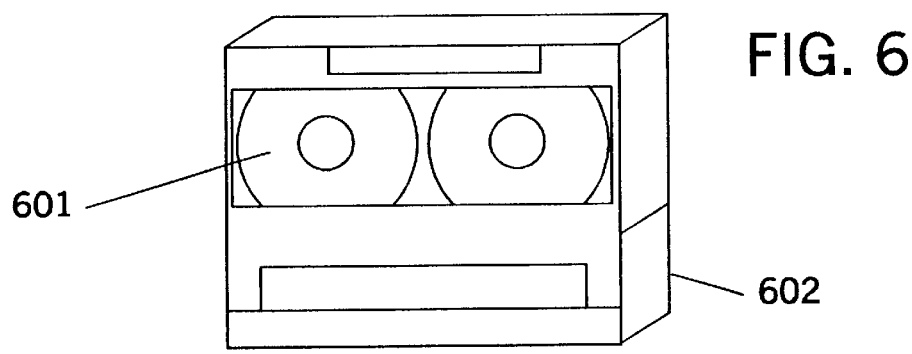
FIG. 6 illustrates one example of a media on which computer program code which implements the present invention might be stored.

The computer program code which is used to implement the invention is often stored on storage media. This media can be a diskette, hard-disk, CD-ROM, DVD-ROM, or tape. The media can also be a memory storage device or collection of memory storage devices such as read-only memory (ROM) or random access memory (RAM). Additionally, the computer code can be transferred to the switch over some type of data network. FIG. 6 illustrates one example of a media. FIG. 6 shows a tape cartridge of the type where magnetic media 601 is enclosed in a protective cassette 602. Magnetic field changes over the surface of the magnetic media 601 are used to encode the computer program code. In this way the computer program code is stored for transport and later retrieval.

Figure 7:
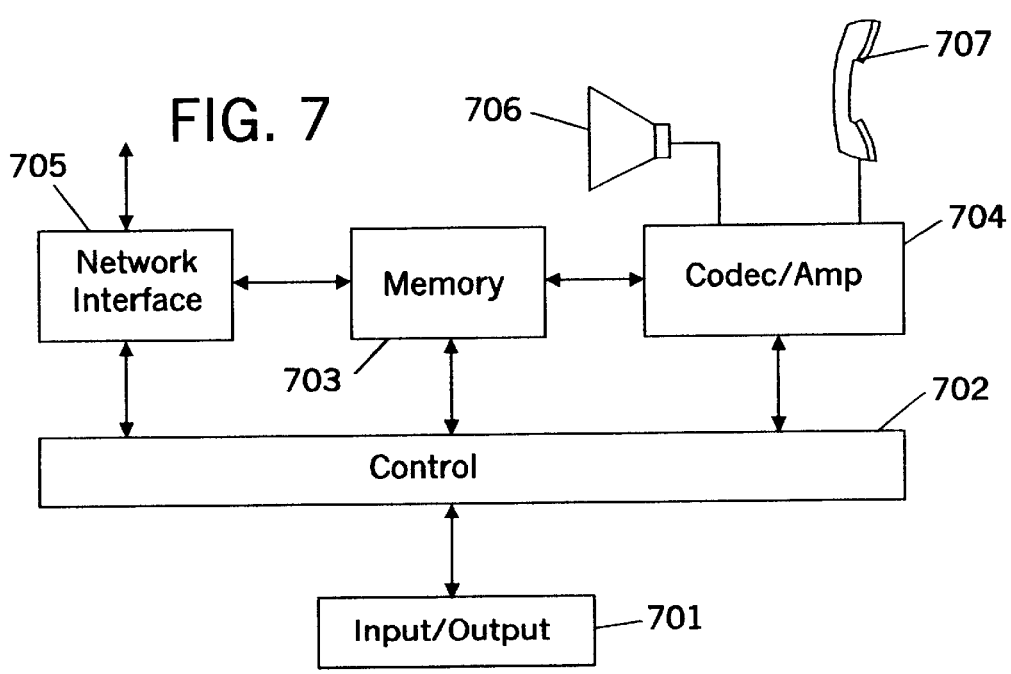
FIG. 7 shows a block diagram of a subscriber device which might be used to implement some aspects of the present invention.

FIG. 7 is a block diagram of a subscriber device which is used to implement the invention in the case where on-hook signaling is provided to control the operation of the CPE so that the audio calling line identification is played while an alerting signal or alerting message is being processed. The subscriber device is interfaced to the telephone network by network interface block 705. The network interface block 705 contains readily available components that depend on the type of telephone network interface involved. For example, if the telephone is an analog phone, network interface block 705 might contain transformers or amplifiers. If the telephone is a digital telephone, network interface block 705 contains drivers, receivers, and media access control circuitry. The details of these devices depend on the type of digital network being used. The network connection is illustrated by a two-way arrow. Block 704 connects the subscriber device to appropriate transducers. In the example of FIG. 7, a telephone handset 707, and speaker 706 are shown. Speaker 706 plays the audible calling line identification of the present invention so that the identification can be heard by a subscriber. If the telephone is a digital phone, block 704 contains an encoder/decoder, or a CODEC. If the device is an analog telephone, block 704 may contain a simple switching arrangement or an amplifier or both.

The operation of the subscriber device of FIG. 7 is controlled by the control block 702 using program code which resides in memory 703. It is this program code which implements any elements of the invention that are carried out in the subscriber CPE. Control block 702 includes a microprocessor or microcontroller and supporting circuitry. The control block, 702, is connected to all other elements of the subscriber device. Memory 703 can be a magnetic storage device, but is more typically a semi-conductor memory device or an array of semi-conductor memory devices, such as programmable read-on memory (PROM), erasable programmable read-on memory (EPROM), or flash memory, or a combination of memory devices. If the subscriber device is a digital phone, memory 703 is also used to temporarily store data which is collected by the CODEC, and so the memory is connected to the CODEC as well as to the control block 702. Input/output (I/O) block 701 includes a keypad, display, and/or any other devices that enable a user to control the device.

One advantage to the present invention over CPE-based, audio calling line identification systems is the ability to use a powerful application server to provide text-to-speech translation services. This powerful application server resides in a service node or intelligent peripheral (IP). Such devices are connected to the PSTN via any of various types of networks. In the examples given so far the service node is connected to the PSTN via an ISDN PRI. However, the service node could also be connected through a high-speed, packet-based network such as an Internet protocol network or an asynchronous transfer mode (ATM) network. In fact, the connection between the service node and the subscriber device that is established to play the audible caller-ID can be circuit switched, packet based, or a combination of the two, depending on the type of network in which the invention is implemented. A server used to implement an intelligent peripheral or service node typically includes dual microprocessors on a single-board computing system. The system includes a bus such as a standard peripheral component interconnect (PCI) bus. A variety of telephone network interface cards can be included depending on the exact network configuration in which the server is deployed. The server which implements the service node or intelligent peripheral also typically includes a video adapter card which allows connection of a personal computer or workstation display for resource management. Alternatively, or in addition, a local area network (LAN) interface can be provided to exchange data for administration and control. The server also typically includes both fixed and removable media devices such as hard-disks, floppy disk drives, CD-ROM drives, and tape drives.

The text-to-speech translation system used with the present invention can be implemented using any standard text-to-speech conversion algorithm. Preferably, the algorithm should provide a way to handle pronunciation of phonemes which may be included in caller names. Such an algorithm would allow a caller's name to be read to a subscriber even though a speech equivalent of the specific name has not previously been stored; however, the invention is still quite useful if only numbers or locations are read from a library of sounds. Text-to-speech conversion is a mature art and various methods of accomplishing the conversion are known. In one embodiment, the process begins by converting text to phonemic code. A sentence parser breaks the input stream into separate words and locates some clause boundaries. A word parser breaks words into their component parts, yielding words in pronounceable form. Strings of text that do not form pronounceable words are spelled out letter by letter. A library of number and symbol pronunciations is used for the numbers or other symbols that might be included in a caller telephone number. A dictionary look-up routine searches pronunciation dictionaries. A letter-to-sound module uses a set of pronunciation rules to assign phonemic form and stress patterns to words not found in the dictionary. A phrase structure model recombines all phonemic output from the dictionary and other modules. Duration of phonemes and pitch commands are computed for each clause and appropriate sound variances are selected for those phonemes that can be pronounced in more than one way. Once the text has been converted to phonemic code, the phonemic code is converted to control commands which operate a synthesizer. Clauses are converted to control signals. The control signals are converted to speech and the speech synthesizer computes the PCM equivalent of speech waveforms with acoustic characteristics that are determined by the synthesizer control commands received.

We have described specific embodiments of our invention which provides for audible calling line identification service for telephone network subscribers. One of ordinary skill in the networking and computing arts will quickly recognize that the invention has other applications in other environments. In fact, many embodiments and implementations are possible. For example, the functions of signaling the subscriber's CPE, name look-up, and text-to-speech translation do not have to reside in separate network elements. Any or all of these functions can be combined into one device on the network. Indeed, it is possible to build a switching system which internally includes the text-to-speech translation services and name look-up services required. In this case, most steps of the method of the invention communicate with various internal switch components. The following claims are in no way intended to limit the scope of the invention to the specific embodiments described.

We claim:

1. A method of providing audible calling line identification to subscriber customer premises equipment (CPE) initially in an on-hook condition, the method being executed in conjunction with sending a call setup message, the method comprising the steps of:

directing the subscriber CPE to establish an off-hook condition and activate a speaker in response to the call setup message;

obtaining calling line identification data;

sending the calling line identification data to a service node containing a text-to-speech translation system;

passing the calling line identification data to the text-to-speech translation system;

connecting the text-to-speech translation system to the subscriber CPE so that audio calling line identification is played over the speaker at the subscriber CPE while the subscriber CPE is in the off-hook condition;

placing the subscriber CPE back into the on-hook condition prior to completing the call associated with the call setup message; and allowing the subscriber CPE to be placed in an off-hook condition to complete the call associated with the call setup message.

2. The method of claim 1 wherein the directing step is accomplished by sending an analog display services interface (ADSI) setup message to the subscriber CPE.

3. A method of providing audible calling line identification by subscriber customer premises equipment (CPE) in an on-hook condition, the method being executed in conjunction with processing a setup message containing digitized audible calling line identification information encapsulated into the setup message, the method comprising the steps of:

activating a speaker in response to the setup message being received from a switch; and playing the digitized audible calling line identification from the setup message while the subscriber CPE is in the on-hook condition and before establishing a call associated with the call setup message to the subscriber CPE.

4. The method of claim 3 wherein the setup message is an analog display services interface (ADSI) setup message.

5. Apparatus for providing audible calling line identification to subscriber customer premises equipment (CPE) initially in an on-hook condition, the apparatus comprising:

means for directing the subscriber CPE to establish an off-hook condition and activate a speaker in response to a call call setup message;

means for obtaining calling line identification data;

means for sending the calling line identification data to a service node containing a text-to-speech translation system;

means for passing the calling line identification data to the text-to-speech translation system; and means for connecting the text-to-speech translation system to the subscriber CPE so that audio calling line identification is played over the speaker at the subscriber CPE while the subscriber CPE is in the off-hook condition;

means for placing the subscriber CPE back into the on-hook condition prior to completing the call associated with the call setup message; and means for allowing the subscriber CPE to be placed in an off-hook condition to complete the call associated with the call setup message.

6. Subscriber apparatus for providing audible calling line identification by subscriber customer premises equipment (CPE) in an on-hook condition, while responding to a setup message containing digitized audible calling line identification information encapsulated into the setup message; the apparatus comprising:

means for activating a speaker in response to the setup message; and means for playing the digitized audible calling line identification from the setup message while the subscriber CPE is in the on-hook condition and before a call associated with the call setup message is established to the subscriber customer premises equipment (CPE).

7. A computer program product for enabling a switching system to provide audible calling line identification to subscriber customer premises equipment (CPE) initially in an on-hook condition in conjunction with sending a call setup message, the computer program product including a computer program comprising:

computer program code for directing the subscriber CPE to establish an off-hook condition and activate a speaker in response to a call call setup message;

computer program code for obtaining calling line identification data;

computer program code for sending the calling line identification data to a service node containing a text-to-speech translation system;

computer program code for passing the calling line identification data to the text-to-speech translation system; and computer program code for connecting the text-to-speech translation system to the subscriber CPE so that audio calling line identification is played over the speaker at the subscriber CPE while the subscriber CPE is in the off-hook condition;

computer program code for placing the subscriber CPE back into the on-hook condition prior to completing the call associated with the call setup message; and computer program code for allowing the subscriber CPE to be placed in an off-hook condition to complete the call associated with the call setup message.

8. The computer program product of claim 7 wherein computer program code for directing sends an analog display services interface (ADSI) setup message to the subscriber CPE.

9. A programmed switching system having a computing module and computer program code for enabling the switching system to provide audible calling line identification to subscriber customer premises equipment (CPE) initially in an on-hook condition in conjunction with sending a call setup message, by performing the steps of:

directing the subscriber CPE to establish an off-hook condition and activate a speaker in response to the call setup message;

obtaining calling line identification data;

sending the calling line identification data to a service node containing a text-to-speech translation system;

passing the calling line identification data to the text-to-speech translation system;

connecting the text-to-speech translation system to the subscriber CPE so that audio calling line identification is played over the speaker at the subscriber CPE while the subscriber CPE is in the off-hook condition;

placing the subscriber CPE back into the on-hook condition prior to completing the call associated with the call setup message; and allowing the subscriber CPE to be placed in an off-hook condition to complete the call associated with the call setup message.

10. The switching system of claim 9 wherein the directing step is accomplished by sending an analog display services interface (ADSI) setup message to the subscriber CPE.

11. A programmed subscriber device including a network interface, an input/output block, and a speaker, the subscriber device further comprising:

a controller connected to the network interface and the input/output block for controlling the operation of the subscriber device; and a memory connected to the controller, the memory including computer program code for enabling the controller to operate the device to provide audible calling line identification while the programmed subscriber device is in an on-hook condition before establishing a call while responding to a call setup message containing digitized audible calling line identification information encapsulated into the setup message, by performing the steps of activating a speaker in response to the setup message, and receiving and playing the digitized audible calling line identification from the setup message while the subscriber device is in the on-hook condition and before the call associated with the call setup message is established.

12. The subscriber device of claim 11 wherein the information is received in an analog display services interface (ADSI) setup message.

13. Apparatus for providing audible calling line identification to connected subscriber customer premises equipment (CPE) which is initially in an on-hook condition, the apparatus comprising:

a service node containing a text-to-speech translation system for translating calling line identification data into an audible calling line identification; and a programmed switching system connected to the text-to-speech translation system, the programmed switching system operable to direct the subscriber CPE to activate a speaker while in an on-hook condition to play digitized audible calling line identification information encapsulated into a call setup message, so that audio calling line identification is played at the subscriber CPE while the subscriber CPE is in the on-hook condition and before a call associated with the call setup message is established to the subscriber CPE.

14. The apparatus of claim 13 wherein the programmed switching system is operable to direct the subscriber CPE to activate the speaker by sending an analog display services interface (ADSI) setup message.

15. A method of providing audible calling line identification information to a called party in connection with an incoming telephone call before customer premises equipment in an on-hook condition associated with the called party is placed in an off-hook condition to answer the incoming telephone call, the method comprising the steps of:

generating audible calling line identification information from caller ID information;

sending the audible calling line identification information to the called party customer premises equipment;

directing the called party customer premises equipment to establish an off-hook condition and activate a speaker to play the audible calling line identification information, and directing the called party customer premises equipment to resume the on-hook condition after playing the audible calling line identification information, prior to the called party customer premises equipment is placed in an off-hook condition to answer the incoming telephone call;

receiving a spoken response from the called party; and disposing of the incoming telephone call by selectively placing the called party customer premises equipment in the off-hook condition to answer the incoming telephone call according to the spoken response from the called party.

16. The method of claim 15, wherein the step of generating audible calling line identification information is performed by a service node.

17. The method of claim 16, wherein the service node is an intelligent peripheral.

18. The method of claim 15, wherein the step of disposing of the incoming telephone call comprises connecting a calling party to the called party.

19. The method of claim 15, wherein the step of disposing of the incoming telephone call comprises:

not connecting a calling party to the called party, and generating a spoken response to the calling party indicating that the called party has not accepted the telephone call.

20. The method of claim 15, wherein the step of directing is accomplished by sending an analog display services interface setup message to the called party customer premises equipment, a programmed switching system connected to the text-to-speech translation system, the programmed switching system operable to direct the subscriber CPE to activate a speaker, obtain the calling line identification data and send the calling line identification data to the text-to-speech translation system, and to connect the text-to-speech translation system to the subscriber CPE so that audio calling line identification is played at the subscriber CPE before a call is established to the subscriber CPE.

21. A method of providing audible calling party identification information to a called party in connection with an incoming telephone call before customer premises equipment in an on-hook condition associated with the called party is placed in an off-hook condition to answer the incoming telephone call, the method comprising the steps of:

generating audible calling party identification information from caller ID information associated with the calling party;

sending the audible calling party identification information to the called party customer premises equipment in a call setup message associated with the incoming telephone call;

directing the called party customer premises equipment to activate a speaker prior to the called party customer premises equipment being placed in the off-hook condition to play the audible calling line identification information from the call setup message associated with the incoming telephone call;

receiving an indication from the called party as to how the incoming call should be disposed; and generating a spoken response to the calling party indicating that the called party has not accepted the incoming telephone call if the indication received from the called party is that the incoming telephone call should not be connected.

22. The method of claim 21, wherein the step of receiving an indication comprises receiving a spoken response from the called party.

23. The method of claim 21, wherein the step of generating audible calling party identification information is performed by a service node.

24. The method of claim 23, wherein the service node is an intelligent peripheral.

25. The method of claim 21, wherein the step of directing is accomplished by sending an analog display services interface setup message to the called party customer premises equipment.

* * * * *